(12) United States Patent
Gupta et al.

(10) Patent No.: US 11,281,815 B2
(45) Date of Patent: Mar. 22, 2022

(54) SYSTEM AND METHOD FOR DESIGN AND MANUFACTURE OF STEADY LATTICE STRUCTURES

(71) Applicants: Siemens Industry Software Inc., Plano, TX (US); Georgia Tech Research Corporation, Atlanta, GA (US)

(72) Inventors: Ashish Gupta, Atlanta, GA (US); George Allen, Okinawa (JP); Jaroslaw Rossignac, Atlanta, GA (US); Kelsey Kurzeja, Atlanta, GA (US); Suraj Ravi Musuvathy, Princeton Junction, NJ (US)

(73) Assignees: Siemens Industry Software Inc., Plano, TX (US); Georgia Tech Reserch Corporation, Atlanta, GA (US)

( * ) Notice: Subject to any disclaimer, the term of this patent is extended or adjusted under 35 U.S.C. 154(b) by 0 days.

(21) Appl. No.: 16/954,850

(22) PCT Filed: Feb. 5, 2019

(86) PCT No.: PCT/US2019/016584
§ 371 (c)(1),
(2) Date: Jun. 17, 2020

(87) PCT Pub. No.: WO2019/156947
PCT Pub. Date: Aug. 15, 2019

(65) Prior Publication Data
US 2021/0089688 A1    Mar. 25, 2021

Related U.S. Application Data

(60) Provisional application No. 62/627,422, filed on Feb. 7, 2018.

(51) Int. Cl.
*G06F 30/10* (2020.01)
*B33Y 50/00* (2015.01)
*G06F 119/18* (2020.01)

(52) U.S. Cl.
CPC .............. *G06F 30/10* (2020.01); *B33Y 50/00* (2014.12); *G06F 2119/18* (2020.01)

(58) Field of Classification Search
CPC ...... G06F 30/10; G06F 2119/18; B33Y 50/00
See application file for complete search history.

(56) References Cited

U.S. PATENT DOCUMENTS

2015/0193559 A1*  7/2015  Musuvathy ........... B29C 64/386
                                                    703/1

FOREIGN PATENT DOCUMENTS

WO      2017088134 A1     6/2017

OTHER PUBLICATIONS

Parthasarathy, J., Starly, B., & Raman, S. (2011). A design for the additive manufacture of functionally graded porous structures with tailored mechanical properties for biomedical applications. Journal of Manufacturing Processes, 13(2), 160-170. (Year: 2011).*

(Continued)

*Primary Examiner* — Bijan Mapar

(57) ABSTRACT

A method, and corresponding systems and computer-readable mediums, for designing and manufacturing a part. A method includes receiving part data for a part to be manufactured. The method includes creating a set of balls and beams in a computer-aided design (CAD) model, in a patterning structure and based on the part data. The method includes constructing a steady lattice structure in the CAD model. The method includes displaying the CAD model including the steady lattice structure.

17 Claims, 10 Drawing Sheets

(56) References Cited

OTHER PUBLICATIONS

Nguyen Dinh Son et al: "A Method to generate lattice structure for Additive Manufacturing", 2016 IEEE International Conference on Industrial Engineering and Engineering Management (IEEM), IEEE, Dec. 4, 2016, pp. 966-970.
DEstreaming: "A quick look at Autodesk Within", Youtube, Aug. 28, 2015, p. 1, Retrieved from the Internet: URL: https://www.youtube.com/watch?v=stPbmGpvCuw [retrieved on Apr. 5, 2019].
Ashish Gupta et al., "Designing and processing parametric models of steady lattices", Elsevier, Jun. 30, 2018, Retrieved from the Internet: URL:https://pdrs.semanticscholar.org/2970/f31a4cd9c5c5719798e7264a944359c3684d.pdf [retrieved on Apr. 2, 2019].
PCT International Search Report and Written Opinion of International Searching Authority dated Apr. 17, 2019 corresponding to PCT International Application No. PCT/US2019/016584 filed Feb. 5, 2019.

* cited by examiner

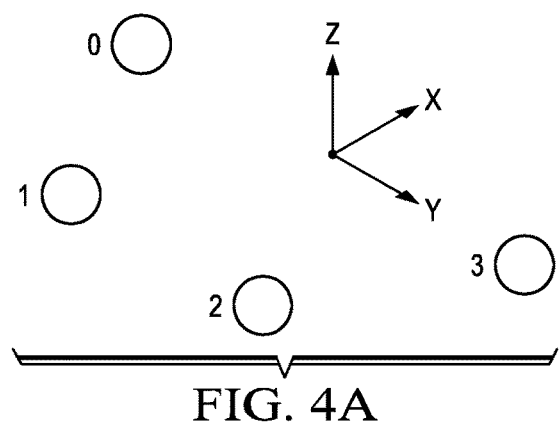
FIG. 4A
```
U, V, W= TRANSLATION ALONG
X, Y AND Z RESPECTIVELY
i= 20
j= 5
k= 5
```
FIG. 4B
| BEAMS |
|---|
| (0,1,0,0,0) |
| (1,2,0,0,0) |
| (2,3,0,0,0) |
| (0,1,1,0,0) |
| (3,2,1,0,0) |
| (3,0,0,1,0) |
| (0,0,0,0,1) |
| (1,1,0,0,1) |
| (2,2,0,0,1) |
| (3,3,0,0,1) |
FIG. 4C
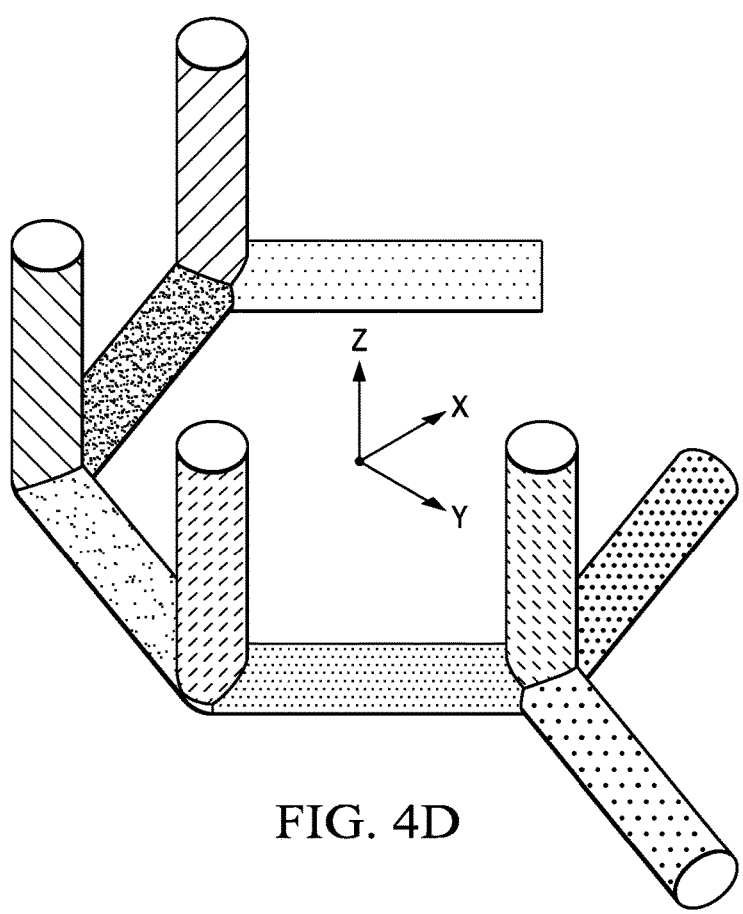
FIG. 4D

SYSTEM AND METHOD FOR DESIGN AND MANUFACTURE OF STEADY LATTICE STRUCTURES

CROSS-REFERENCE TO OTHER APPLICATION

This application claims the benefit of the filing date of U.S. Provisional Patent Application 62/627,422, filed Feb. 7, 2018, which is hereby incorporated by reference.

STATEMENT REGARDING FEDERALLY SPONSORED RESEARCH OR DEVELOPMENT

This invention was made with government support under the Government Prime Award No: HR0011-17-2-0015 awarded by the United States Defense Advanced Research Projects Agency (DARPA). The government has certain rights in the invention.

TECHNICAL FIELD

The present disclosure is directed, in general, to design and manufacture of products using additive manufacturing techniques, and in particular to such design and manufacture of physical parts using lattice structures.

BACKGROUND OF THE DISCLOSURE

Additive manufacturing processes can use lattice structures in the manufacture of parts to provide support structures or interior areas of the parts that are structurally strong but lighter in weight and use less material than a solid fill. However, the design of complex lattice structures can be challenging in conventional systems. Improved systems are desirable.

SUMMARY OF THE DISCLOSURE

Various disclosed embodiments include a method, and corresponding systems and computer-readable mediums, for designing and manufacturing a part. A method includes receiving part data for a part to be manufactured. The method includes creating a set of balls and beams in a computer-aided design model, in a patterning structure and based on the part data. The method includes constructing a steady lattice structure in the CAD model. The method includes displaying the CAD model including the steady lattice structure.

Some embodiments also include computing integral properties of at least one of the steady lattice structure, each of a plurality of rows in the steady lattice structure, or a plurality of hubs in the steady lattice structure.

In some embodiments, the steady lattice structure is created by connecting adjacent balls in the set of balls with beams, wherein each beam is divided into half-beams, and the union of each ball and its connected half-beams defines a hub. In some embodiments, the steady lattice structure includes repeating patterns of hubs. Some embodiments also include computing integral properties using closed-form expressions. In some embodiments, the steady lattice structure is displayed using swirling curves. In some embodiments, each ball is created by applying a same similarity transform. Some embodiments also include manufacturing the part according to the CAD model.

Other embodiments include a data processing system comprising at least a processor and accessible memory, configured to perform processes as disclosed herein.

Other embodiments include a non-transitory computer-readable medium encoded with executable instructions that, when executed, cause a data processing system to perform processes as disclosed herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 4A-4F illustrate an example of a steady lattice and the associated terminology in accordance with disclosed embodiments;

DETAILED DESCRIPTION

The Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Additive manufacturing enables manufacturing on complex lattice structures that provide several advantages to the design of a product including, but not limited to, a high strength-to-weight ratio, vibration damping, improved cooling efficiency, etc. Due to the geometric complexity in the number of faces, representing a lattice structure in a computer aided-design (CAD) system and analyzing its characteristics such as mass properties is a computationally challenging problem. Disclosed embodiments include systems and methods that can describe non-trivial lattice structures in a compact manner and evaluate their properties in a computationally efficient manner, enabling design and manufacture of superior products with complicated lattice structures.

A lattice is modeled as a repeated pattern of cells. A cell defines the truss template geometry, typically as a collection of connected beam-like shapes. One type of repeating pattern is an axis-aligned translation. Other types of patterns include those that are aligned with a special coordinate system (e.g., cylindrical), or more generally conformally aligned to a sculptured surface. Other approaches include a 3D texture-mapping approach.

Figure 1A:
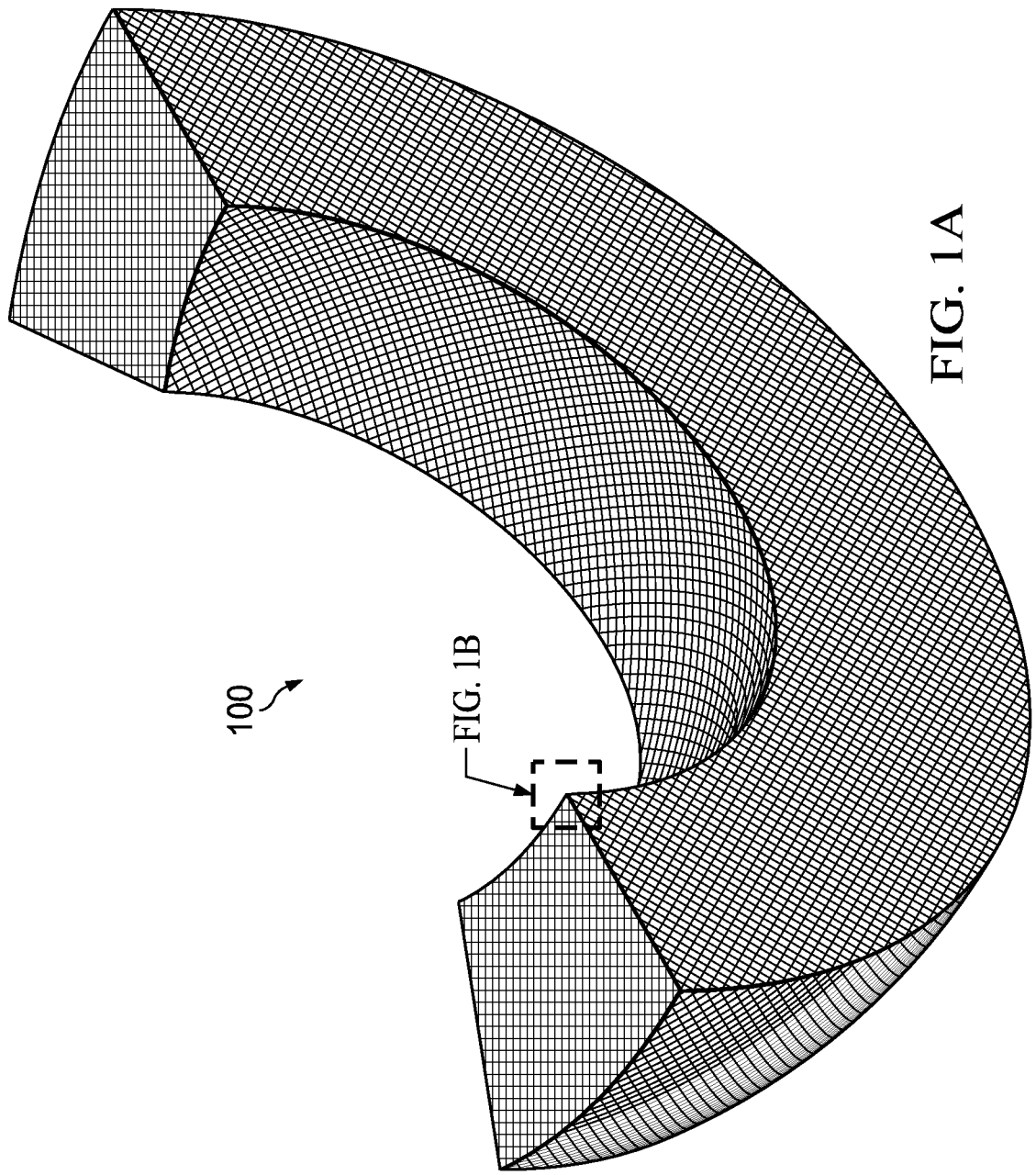
FIG. 1A illustrates an example of a model of a part to be manufactured that includes a lattice structure in accordance with disclosed embodiments.
Figure 1B:
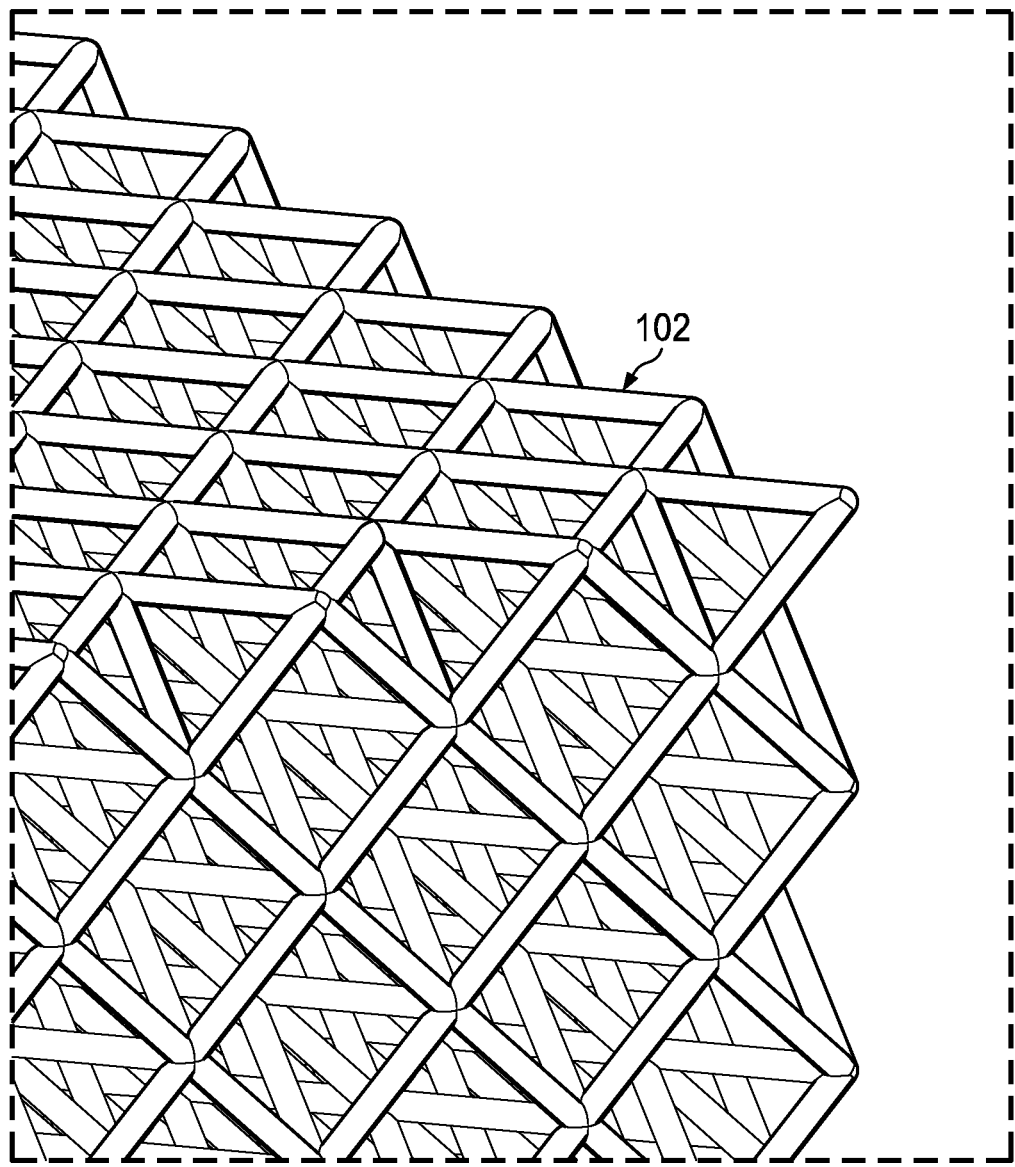
FIG. 1B illustrates more detail of the lattice structure illustrated in the call-out area of FIG. 1A, in accordance with disclosed embodiments.

FIG. 1A illustrates an example of a model 100 of a part to be manufactured that includes a lattice structure. FIG. 1B illustrates more detail of the lattice structure 102 illustrated in the call-out area of FIG. 1A. This example shown an octet lattice with 7,680,000 beams as described below. Octet lattices, honeycomb lattices, and octahedral lattices are examples of steady lattices, as described below, that can be created using processes as described herein.

Typical approaches apply patterning to cells, thereby treating a cell as the smallest repeating unit of a truss-like lattice. Disclosed embodiments, instead of using a cell, construct a lattice by considering a 3D point (or "node") and a spherical ball centered at that node. "Node" may be used to refer to the 3D point or the ball as appropriate. A lattice is constructed by creating a set of balls, defining a patterning structure for the balls, and defining a set of connections between pairs of balls with beam-like shapes. The "beam" refers to a solid cone-section that connects the pair of balls. The surface of each beam connects tangentially to the two nodes of the lattice, such that its union with these two nodes is the convex hull of the nodes. Each beam can be split into two half-beams by a plane that is orthogonal to its axis of revolution and equidistant from its nodes.

Figure 2:
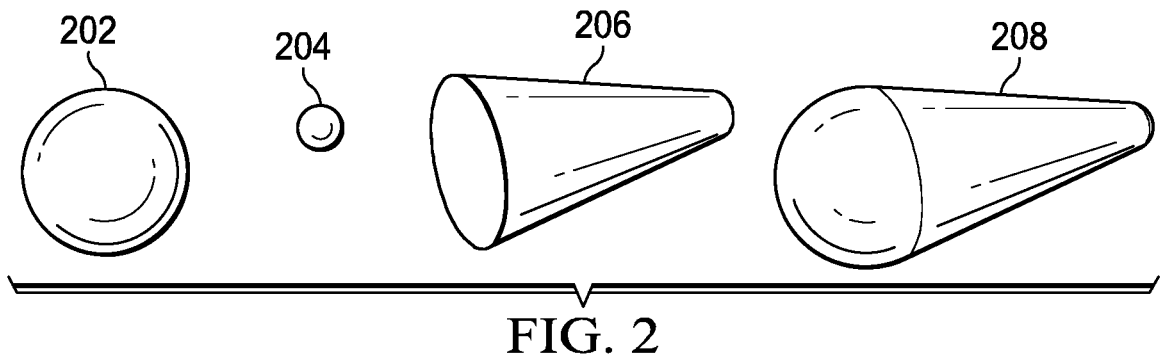
FIG. 2 illustrates examples of balls and beams and their union in accordance with disclosed embodiments.

FIG. 2 illustrates examples of balls and beams and their union. This figure shows balls 202 and 204 as disclosed herein. Beam 206 is the solid cone-section that corresponds to balls 202 and 204 and their respective radii/diameters. Union structure 208 illustrates the union of beam 206 with balls 202 and 204.

As disclosed herein, several connections may be incident at a ball. The hub at that node is the union of the ball and the incident halves of the connections at that node (all the half beams connected to the node). This hub is treated as the smallest patterned unit. A lattice can be decomposed into an assembly of hubs. A lattice is "clean" when the interiors of its hubs are pairwise disjoint.

Figure 3B:
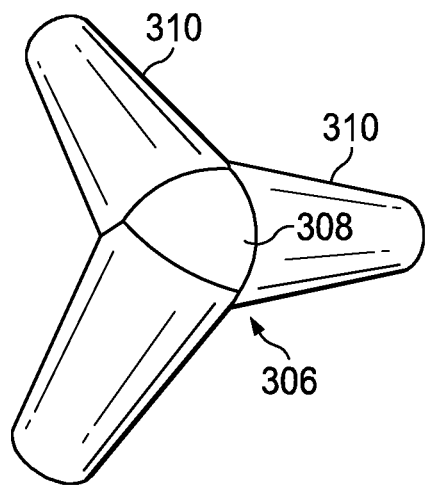
FIGS. 3A-3C illustrate a lattice, its hubs, and half beams in accordance with disclosed embodiments.
Figure 3C:
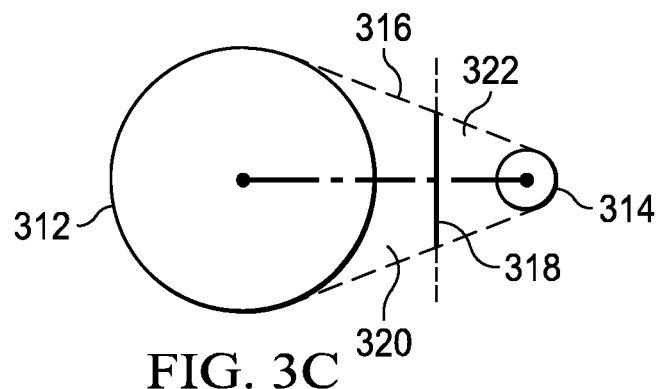
Figure 3A:
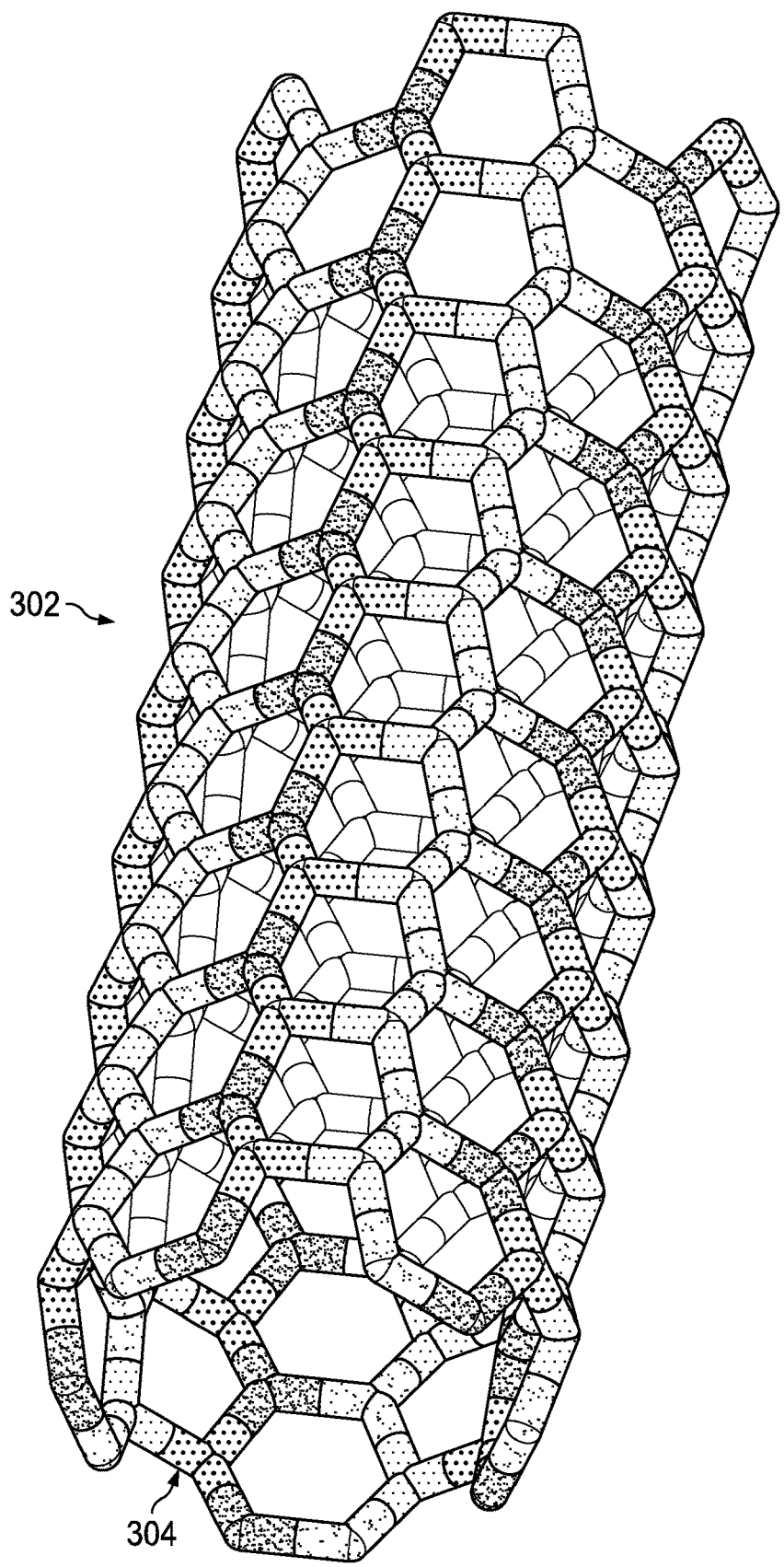

FIGS. 3A-3C illustrate a lattice, its hubs, and half beams in accordance with disclosed embodiments. FIG. 3A illustrates an exemplary lattice 302 comprised of a plurality of interconnected hubs 304. FIG. 3B illustrates a more detailed view of a single hub 306 that includes a ball 308 in union with a plurality of half beams 310. FIG. 3C illustrates how a beam 316 between balls 312 and 314 is "cut" along cut 318 to form half beams 320 and 322.

Disclosed embodiments can use a steady similarity pattern for constructing the ball patterns of lattice, where each subsequent instance of the steady similarity pattern is defined by applying the same similarity transform to the previous instance. Disclosed embodiments can compute integral properties of steady rows without iterating over all the instances in the row, but instead by evaluating a closed-form expression for a sum of a sequence. This enables the system to compute mass properties including, but not limited to. weight, center of mass, and moments of inertia.

In some cases, in a user interface during the design process, the system can display swirling curves instead of the actual geometry when visualizing highly complex lattices. This serves as a representative visualization of the pattern layout but reduces rendering and visualization processing time.

For purposes of the discussion below, the following notation is used:

O, P, Q, F, $P_i$: Isolated points.
FP: vector from F to P.
I, J, K, N, V, $V_i$: vectors.
$\underline{V}$, $\underline{FP}$: normalized (unit) versions of these vectors.
$V^\circ$ ($\alpha$, N): V rotated by $\alpha$ around N.
$V^\circ$ (N): V rotated by $$\frac{\pi}{2}$$

around N.

F(O,I,J,K,s): Frame (origin O, orthonormal basis vectors I, J, K and scaling s) represents a similarity.

A set of solids $X_i$ is a steady pattern when there exists a similarity S such that, for each valid index i, $X_i = S^k \cdot X_0$.

A lattice is a "steady lattice" when it satisfies the following two conditions:

1) The nodes of the lattice can be organized into an $\underline{i} \times \underline{j} \times \underline{k}$ array of cells, each cell denoted by C[i,j,k], and that there exists three similarities, (U,V,W), such that for all valid triplets (i,j,k), i.e. i∈[0,$\underline{i}$], j∈[0,$\underline{j}$], and k∈[0,$\underline{k}$], C[i,j,k]=$W^k \cdot V_j \cdot U^i \cdot C_0$, where $C_0$=C[0,0,0] is the starting cell, which implies that the nodes of each cell are numbered consistently, and the node n in cell C[i,j,k], denoted as N[i,j,k,n], is given by $W^k \cdot V^j \cdot U^i \cdot$N[0,0,0,n]. As a special case, a lattice is "regular" if all three similarities are orthogonal translations.

2) If the lattice contains a beam B(s,e,$d_i,d_j,d_k$) that connects node N[i,j,k,s] to node N[i+$d_i$,j+$d_j$,k+$d_k$,e] for a particular triplet(i,j,k), then the lattice also contains beams N[i',j',k',s] to N[i'+$d_i$,j'+$d_j$,k'+$d_k$,e] for all other triplets (i',j', k') for which cells C[i',j',k'] and C[i'+$d_i$,j'+$d_j$,k'+$d_k$] exist.

Figure 4E:
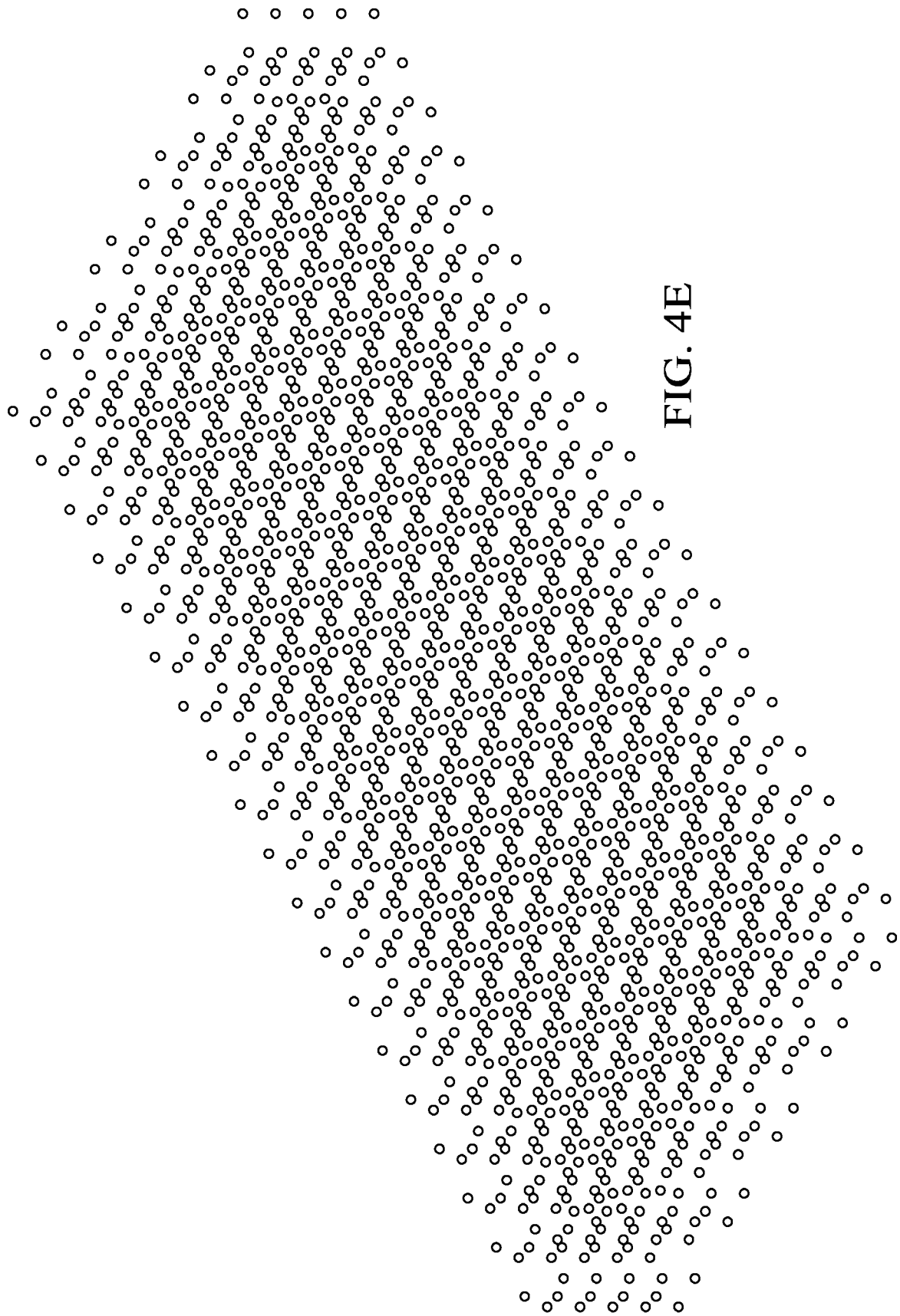
Figure 4F:
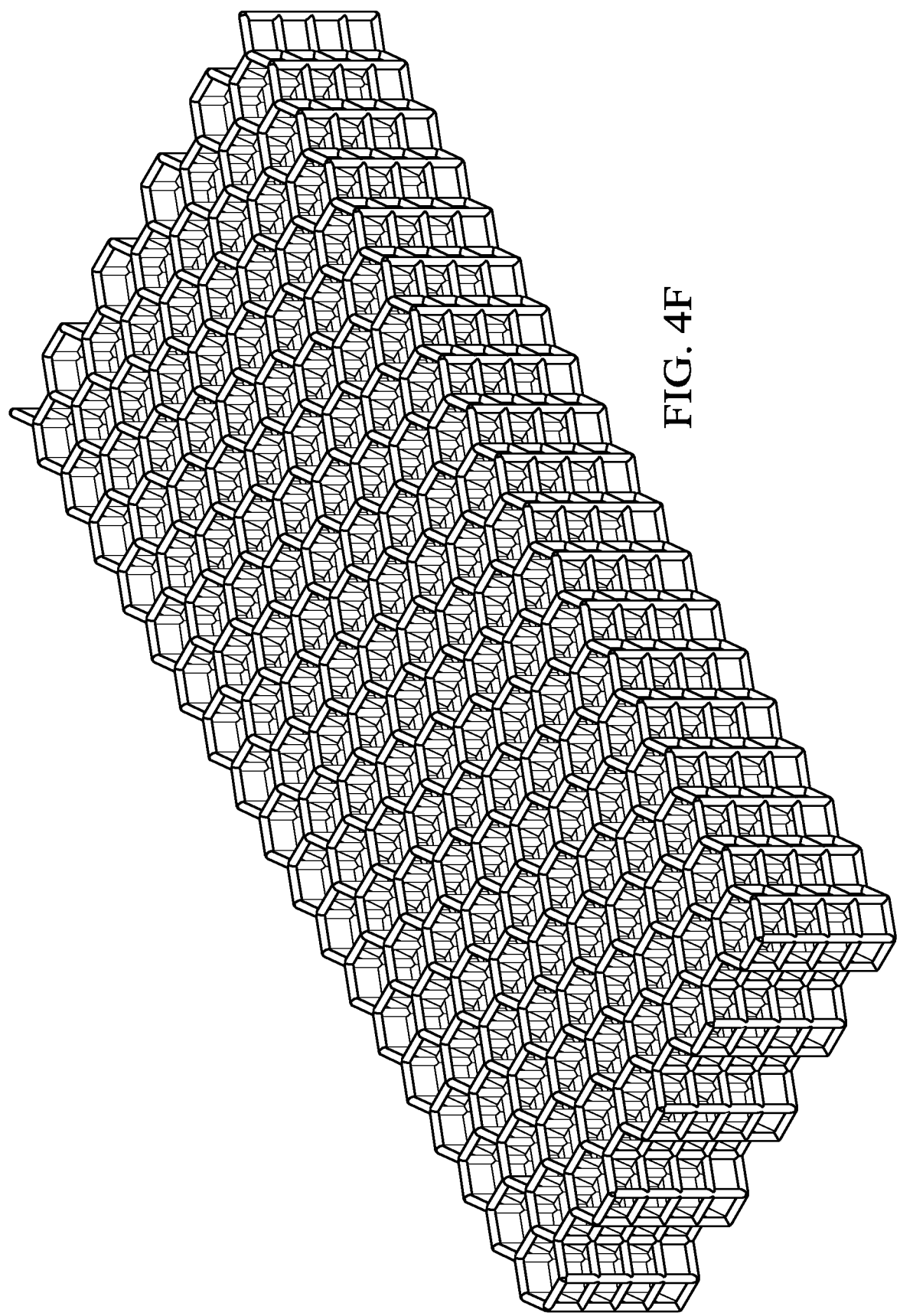

FIGS. 4A-4F illustrate an example of a steady lattice and the associated terminology. FIG. 4A illustrates a starting cell. FIG. 4B illustrates similarities and repetition counts. FIG. 4C illustrates beams. FIG. 4D illustrates a starting cell and a beam of each type. FIG. 4E illustrates all cells. FIG. 4F illustrates all cells U beams corresponding to every cell to create a steady lattice.

Though the class of lattices described above have limited degrees of freedom, they offer substantial computational advantages over lattices produced by other approaches. These advantages enable a system as disclosed to model, analyze, and manufacture lattices with billions or trillions of elements.

As discussed below, the hub on node $N[i,j,k,n]$ is denoted as $H[i,j,k,n]$. For each fixed set of index pairs (i,j), the set of hubs $H_k$ is a steady pattern. Disclosed processes can compute integer or fractional powers of a similarity, so that it can directly (without iteration) compute the hubs of a cell $C[i,j,k]$. These steady patterns can be exploited to accelerate the computation of various integral properties (surface area, volume, centroid, inertia) of the lattice, by reducing its computational complexity from $O(\underline{i} \times \underline{j} \times \underline{k})$ to $O(\underline{i} \times \underline{j})$. For a detailed lattice with k>100, such a reduction results in a significant speed-up, which may be important during design optimization.

Disclosed embodiments can define a typical lattice using a set of control parameters to adjust the overall shape, size, connectivity, and gradation of the lattice in an optimization cycle.

A periodic lattice is defined as a regular pattern of identical copies of an irreducible unit-cell, where a unit-cell consists of one or more balls and connecting beams. Lattices can be one-, two-, or three-dimensional by considering a lattice to be an assembly of unit-cells repeating in one, two or three directions respectively. However, mathematically speaking, lattices are always three-dimensional, since they are made of solid primitives. Therefore, they can be referred to as one, two or three directional based on the number of directions in which they repeat.

In solid modeling, the term "assembly" generally refers to a set of solids with disjoint interiors. In a typical lattice, each node (ball) interferes (i.e., has a non-empty intersection) with one or more beams, and two beams incident on a node may interfere with each other. Therefore, the lattice is not an "assembly of nodes and beams," using solid-modeling terminology, but is a collection of or the set-theoretic union of them. The term "assembly of identical cells" is ambiguous and difficult to interpret in a solid modeling setting for two reasons. Although the dimensions of the axis-aligned cells and the distance between them, in a lattice with translational periodicity, are fixed by the periodicity of the lattice, their alignment (absolute positions) is not. For example, in a given lattice structure, a unit-cell can be defined in a plurality of ways, such as by splitting nodes or splitting beams at different locations within the overall lattice structure.

For these reasons and others, unit-cell-based terminologies and mathematical formulations used in other, simpler translational structures or deformations of these are not appropriate in describing the processes disclosed herein. Hence, the description herein decouples lattice balls and beams, group balls into "cells" and define "beams" as connections between balls within a cell or two different cells. Steady patterns of these cells are identified using similarities, which ensures that the balls remain spherical. Beams can then be constructed using the balls in these cells.

Finally, the system can decompose the lattice into an "assembly of hubs" where the hubs are quasi-disjoint. Besides being a more apt unit for a solid modeling assembly, a hub has several other advantages for geometry processing.

In processes as disclosed herein, the set of cells $C_i$ for a fixed index pair (j,k) forms a steady pattern with the starting cell $C[0,j,k]$. The set of cells along $C_j$ for a fixed index pair (i,k) forms a steady pattern with the starting cell $C[i,0,k]$. The set of cells along $C_k$ for a fixed index pair (i,j) forms a steady pattern with the starting cell $C[i,j,0]$.

Given a beam $B[s,e,d_i,d_j,d_k]$ connecting ball $N[i,j,k,s]$ to ball $N[i+d_i,j+d_j,k+d_k,e]$, the set $B_k$ of its instances in cells $C_k$ for a fixed index pair (i,j) forms a steady pattern. A steady lattice consists of steady pattern of cells (of balls) $C_k$ and of beams $B_k$ for a fixed index pair (i,j). Moreover, both for the cells and for the beams, the steady pattern is defined by similarity w, hence in a steady lattice, the set of hubs $H_k$ for a fixed set of index pair (i,j) forms a steady pattern, i.e. a hub $H[i,j,k,n]$ at ball n in cell $C[i,j,k]$ is given by $W^k \cdot H[i,j,0,n]$ for a fixed index pair (i,j).

To compute the balls in cell $C[i,j,k] = W^k \cdot V_j \cdot U^i \cdot C_0$ in a steady lattice, the system can compute the powers $(U^i, V^j, W^k)$ of similarity transforms. The system can perform a canonical decomposition of a similarity. A given similarity u can be decomposed into the canonical commutative product $R \cdot T$, where R and T are primitive transformations (translation, rotation and scaling), such that $U^t = R^t \cdot T^t$ for any value of parameter t.

Two cases can be distinguished depending on the value of m, the scaling factor of U, which is defined to be strictly positive.

When m=1, U is a rigid body transformation. Then, R is a rotation and T is a translation by a vector parallel to the axis of R. In this case, as t varies, $U^t$ defines a "screw motion" and $U^t \cdot P_0$ traces a helix.

When m≠1, U is a similarity. Then, R is a rotation and T is a dilation about a fixed point F on the axis of R. In this case, as t varies, $U^t$ defines a swirl motion and point $U^t \cdot P_0$ traces a concho-spiral.

The precise expressions for these two motions are:

$$U^t \cdot P_0 := F + (td)N + (FP_0) \cdot (ta, N) \quad \text{Screw}$$

$$U^t \cdot P_0 := F + m^t (FP_0) \cdot (ta, N) \quad \text{Swirl}$$

These are evaluated for uniformly spaced values of t to produce steady patterns.

Here, F is the fixed point, N is the unit vector along the axis of rotation, a is the angle of rotation, d is the distance of translation for the screw, and m is scaling for the swirl.

Note that, in special cases, the screw may reduce to pure translation (a=0) or pure rotation (d=0) and the swirl may reduce to pure scaling (a=0).

The steady pattern of shapes that are produced using patterns of similarity frames (along the above screw and swirl motions) that result from a uniform sampling of t are called "screw-patterns" and "swirl-patterns."

The system can perform direct computation of cell balls. To compute the balls of cell $C[i,j,k]$, the system can transform each ball of cell $C[0,0,0]$, by the appropriate similarity. The system can precompute the canonical decomposition of each of the similarities U, V, and W that define a steady lattice. Then, the system computes the center and radius of ball $N[i,j,k,n]$ by transforming the center $C_n$ and radius $r_n$ of the corresponding ball in the starting cell as follows, assuming that $m_u$, $m_v$ and $m_w$ are the scaling factors of U, V, and W.

$$N[i,j,k,n] = \text{Ball}(W^k \cdot V^j \cdot U^i \cdot Cn, m_w^k m_v^j m_u^i r_n)$$

The system can perform direct computation of interpolating cells. The parameters of similarities U, V, and W may be defined explicitly, such as by a user or in a model. Although this approach may work when U, V, and W are simple (for example, rotations or translations about the same or orthogonal axes), it fails completely when attempting to design a pattern that interpolates the first and last cell, which may have each been carefully placed to meet some assembly constraints.

To address this issue, the system can compute the incremental similarities, such that the resulting pattern interpolates the first and last key-cells, which are related by a cumulative similarity, say $U^I = U^{i-1}$. In this scenario, the user may adjust $U_I$ to control the overall size, shape, and scaling of the lattice using the first and last cells in a particular direction. Given $U^I$ and the repetition count i, the system can use canonical decomposition to compute the incremental similarity as $$U = U^{\frac{1}{(i-1)}},$$

i.e. a fractional power of $U^I$. This approach always yields a valid solution. This can be used to produce, for example, a steady one-directional lattice by interpolating between the start frame and a cumulative similarity frame.

The system can compute specific integral properties, such as surface area, volume, center of mass, and spherical inertia of the lattice given the corresponding property of all the hubs in the k=0 layer of cells, that is the set of cells C[i,j,0] for all valid index pairs (i, j). Integral properties of a single hub may be approximated from its voxelization or octree decomposition, from ray sampling, or from a triangulation of its boundary.

To improve hub approximation with using as few rays as possible, the system can split the hub into a core and clean portions of half-beams, and compute integral properties of the hub by aggregating integral properties of its core and of its clean portions.

Figure 5A:
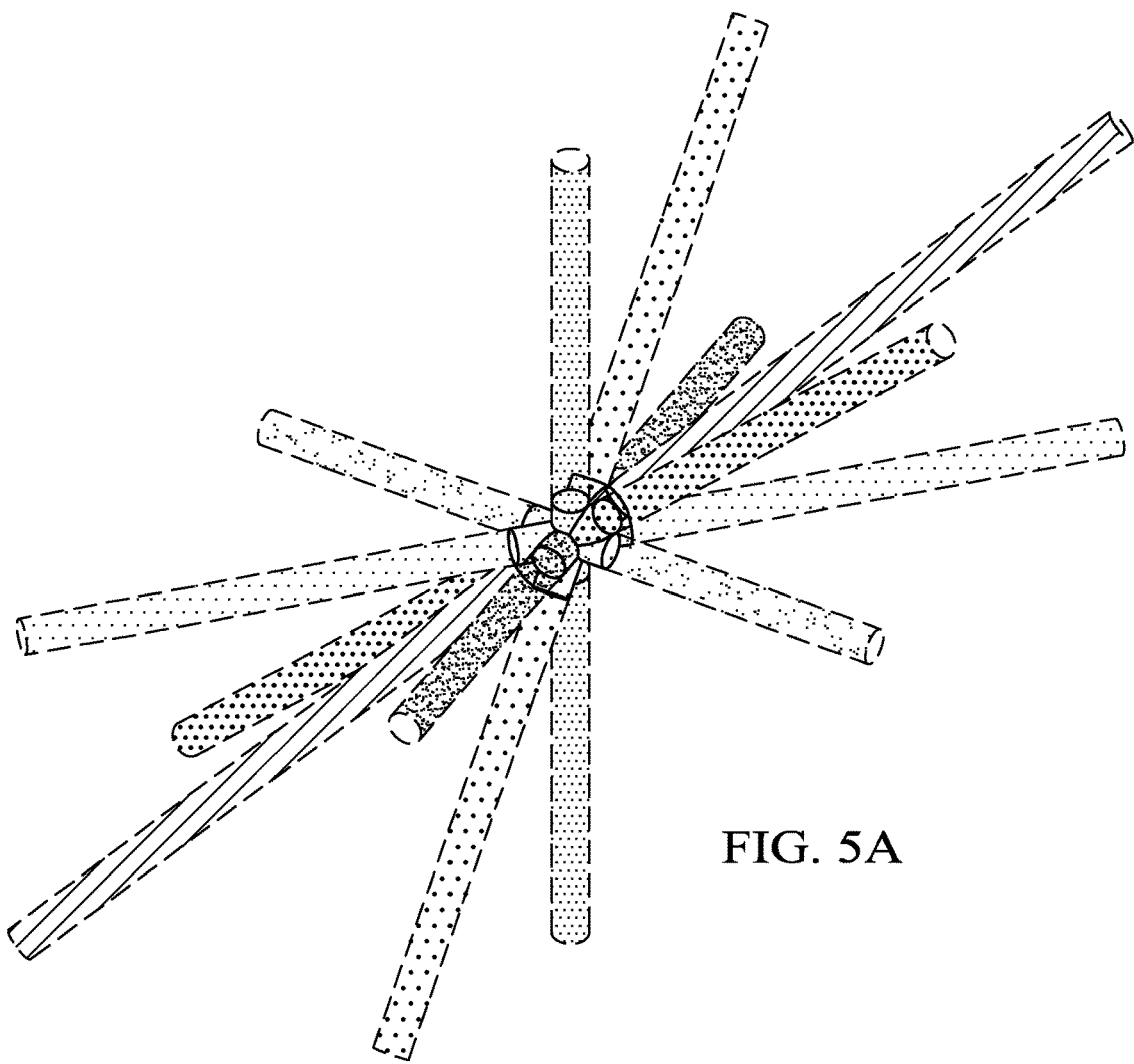
FIG. 5A illustrates a clean portion of the spit hub and FIG. 5B illustrates a core portion of a hub, in accordance with disclosed embodiments.
Figure 5B:
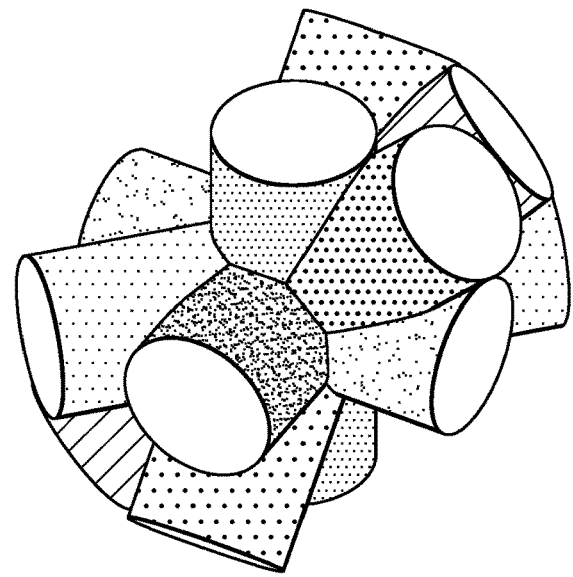

FIG. 5A illustrates a clean portion of the split hub and FIG. 5B illustrates a core portion of a hub. "Clean portions" refers to interiors of those half-beam portions that are pairwise disjoint. To identify the clean portion of each half-beam, the system can compute, in a pairwise manner, how far the intersection of two half-beams extend along the axis of the two half-beams. This is reduced to a 2D problem of identifying intersection of two lines corresponding to the profile of the two half-beams in the plane of their axes. The system can then split each half-beam at the farthest intersection, to extract its clean portion.

The integral properties of the core can then be approximated from its tetrahedral discretization. For the clean portions of the half-beams (cylinders or cones), the integral properties can be computed using closed-form expressions.

To compute the surface area of the lattice, the system can let $a_0$ be the total surface area of all the hubs (without the end caps of half-beams) in the k=0 layer of cells and let $a_k$ denote the surface area of all the hubs in kth layer of cells.

If $W^k$ is a screw pattern, each hub of the k=0 layer undergoes a rigid transformation, hence the total surface area $a_L$ of the lattice is simply $ka_0$.

If $W^k$ is a swirl pattern, a hub of the k=0 layer is scaled by $m_w^{2k}$, hence the total surface area of the lattice is:

$$a_L = \sum a_k = a_0 \sum (m_w^2)^k = \frac{a_0(m_w^{2k} - 1)}{(m_w^2 - 1)}$$

Note that, as used herein, $\Sigma$ is used to denote $\Sigma_{k=0}^{k-1}$ for simplicity.

To compute the volume of the lattice, the system can let $v_0$ be the total volume of all the hubs in the k=0 layer of cells and $v_k$ be the volume of all the hubs in the $k^{th}$ layer of cells.

If $W^k$ is a screw pattern, the volume $v_L$ of the lattice is simply $kv_0$.

If $W^k$ is a swirl pattern, the volume of the lattice is:

$$v_L = \sum v_k = v_0 \sum (m_w^3)^k = \frac{v_0(m_w^{3k} - 1)}{(m_w^3 - 1)}$$

To computer the centroid of the lattice, the system can let $G_0$ be the centroid (center of mass) of all the hubs in the k=0 layer of cells. Then, assuming uniform material density throughout the lattice, the system can computer the centroid $G_L$ of the whole lattice as the weighted average of all of the k layers of cells:

$$G_L = \frac{v_k W^k \cdot G_0}{v_L}$$

In the case of a swirl pattern, the expression for the centroid is $$G_L = \frac{v_0 \sum (m_w^3)^k W^k \cdot G_0}{\left(\frac{v_0((m_w^3)^k - 1)}{(m_w^3 - 1)}\right)}$$

In case of screw pattern, the volume of each k layer remains constant, thus the expression for the centroid is $$G_L = \frac{v_0 \sum W^k \cdot G_0}{kv_0}$$

The system can computer the spherical moment of inertia of the lattice. The spherical moment of inertia, or simply "spherical inertia", of a body B about a fixed point G is $i_G = \int_B r^2 dm$, where r is the distance of the infinitesimal mass dm from G and body's total mass is $m = \int_B dm$.

The system can compute the mass m, the centroid G, and the spherical inertia i for each hub in the k=0 layer of hubs, about their respective centroid. The system can then compute the mass $m_0$, centroid $G_0$, and spherical inertia $i_0$ of the entire k=0 layer about its centroid $G_0$. The spherical inertia $i_0$ is computed by using the formula above and summing the results. The system can compute the center of mass, $G_L$ of the lattice and then compute the spherical inertia $i_L$ of the whole lattice about $G_L$, by combining the inertia of all the k layers as follows:

$$i_L = \Sigma(i_k + m_k |G_L G_k|^2)$$

where $i_k$ is the spherical inertial of the $k^{th}$ layer about its centroid $G_k$ and its mass $m_k$.

Using vector $V_3=G_LF$, the closed-form expression for a swirl pattern is $$i_L = q_0 + m_0(q_1+q_2+q_3+q_4+q_5)$$

where $$q_0=i_0\Sigma m_w^{5k}, q_1=|V_3|^2\Sigma m_w^{3k}, q_2=|V|^2\Sigma m_w^{5k},$$
$$q_3=2V_3\cdot V_1\Sigma m_w^{4k}, q_4=2V_3\cdot V_2\Sigma(m_w^{4k}c_k), \text{and}$$
$$q_5=2V_3\cdot V_2°(N)\Sigma(m_w^{4k}s_k).$$

The closed-form expression for a swirl pattern uses the same expression for $i_L$, but $$q_0=ki_0, q_1=$$
$$k(|V_3|2+|V|^2+2V_3\cdot V_1), q_2=2d(V\cdot N+V_3\cdot N)\Sigma k, q_3=d^2\Sigma k^2, q_4=$$
$$2V_3\cdot V_2\Sigma c_k, \text{and } q_5=2V_3\cdot V_2°(N)\Sigma s_k.$$

Figure 6:
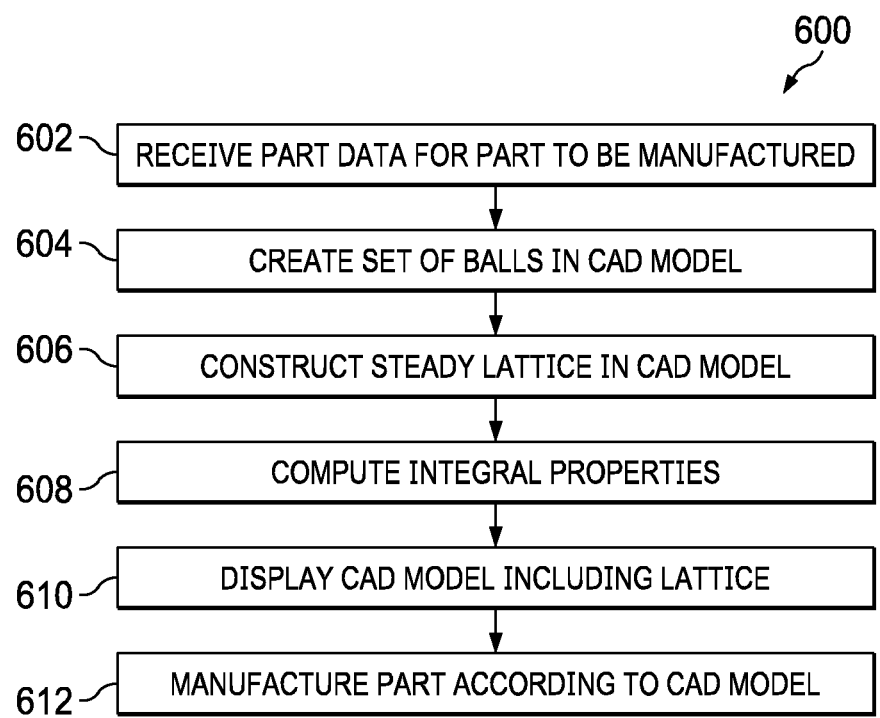
FIG. 6 illustrates a process in accordance with disclosed embodiments.

FIG. 6 illustrates a process 600 in accordance with disclosed embodiments that may be performed by a data processing system as disclosed herein (referred to generically as the "system," below), for designing and manufacturing a part using a steady lattice structure.

The system receives part data for a part to be manufactured (602).

The system creates a set of balls in a computer-aided design (CAD) model, in a patterning structure (604) and based on the part data, wherein each ball is created by applying the same similarity transform. This can be include creating a new CAD model based on the part data or can use a CAD model that is part of the part data.

The system constructs a steady lattice structure in the CAD model by connecting adjacent balls in the set of balls with beams (606). Each beam can be divided into half-beams, and the union of each ball and its connected half-beams defines a hub. The lattice includes repeating patterns of hubs.

The system can compute integral properties of the steady lattice, each of a plurality of rows or layers in the steady lattice, and/or each hub in the steady lattice (608). The integral properties can include the surface area, volume, center of mass, or spherical inertia of the lattice or its elements. The integral properties can be computed using closed-form expressions.

The system displays the CAD model including the steady lattice structure (610). The steady lattice structure can be displayed using swirling curves.

The system can manufacture the part according to the CAD model, including the steady lattice structure (612).

The use of steady lattices as disclosed herein provide several advantages in additive manufacturing. The lattice elements are simple balls and truncated cones (beams). Given the center and radius of each ball, the surface of an individual element (ball or beam) is defined implicitly. Steadiness can be exploited to accelerate identification of hubs intersected by a plane. The constructive solid geometry or boundary representation of each hub has simple mathematical description, which can be used to accurately and efficiently section or voxelize a hub.

Figure 7:
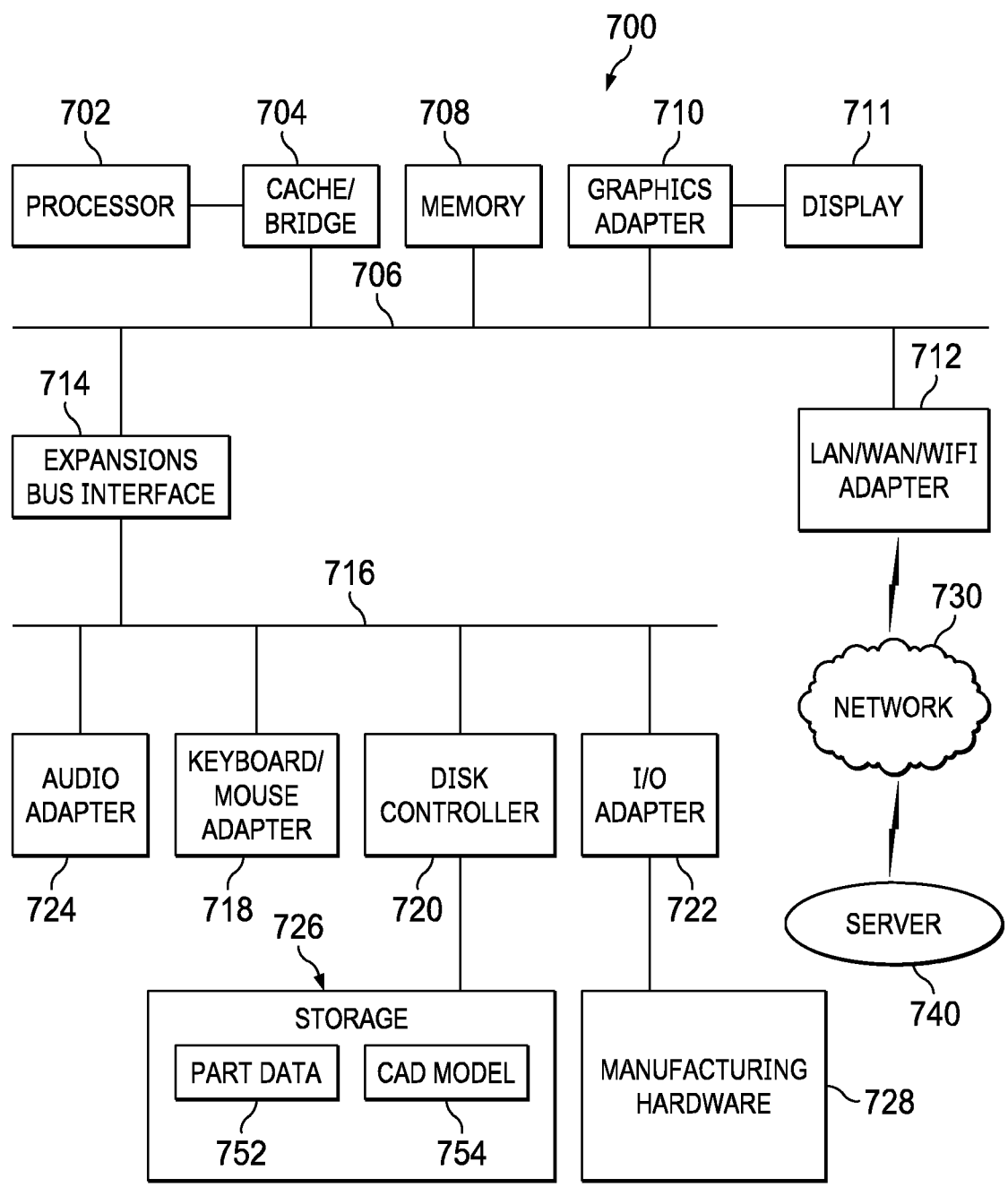
FIG. 7 illustrates a block diagram of a data processing system in accordance with disclosed embodiments.

FIG. 7 illustrates a block diagram of a data processing system in which an embodiment can be implemented, for example as part of a system as described herein, or as part of a manufacturing system as described herein, particularly configured by software or otherwise to perform the processes as described herein, and in particular as each one of a plurality of interconnected and communicating systems as described herein. The data processing system depicted includes a processor 702 connected to a level two cache/bridge 704, which is connected in turn to a local system bus 706. Local system bus 706 may be, for example, a peripheral component interconnect (PCI) architecture bus. Also connected to local system bus in the depicted example are a main memory 708 and a graphics adapter 710. The graphics adapter 710 may be connected to display 711.

Other peripherals, such as local area network (LAN)/Wide Area Network/Wireless (e.g. WiFi) adapter 712, may also be connected to local system bus 706. Expansion bus interface 714 connects local system bus 706 to input/output (I/O) bus 716. I/O bus 716 is connected to keyboard/mouse adapter 718, disk controller 720, and I/O adapter 722. Disk controller 720 can be connected to a storage 726, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 726 can store any data, software, instructions, or other information used in the processes described herein, including part data 752, CAD model 754, or other data.

Also connected to I/O bus 716 in the example shown is audio adapter 724, to which speakers (not shown) may be connected for playing sounds. Keyboard/mouse adapter 718 provides a connection for a pointing device (not shown), such as a mouse, trackball, trackpointer, touchscreen, etc. I/O adapter 722 can be connected to communicate with or control manufacturing hardware 728, which can include any physical systems, devices, or equipment for manufacturing a part, including in particular additive-manufacturing equipment.

Those of ordinary skill in the art will appreciate that the hardware depicted in FIG. 7 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 712 can be connected to a network 730 (not a part of data processing system 700), which can be any public or private data processing system network or combination of networks, as known to those of skill in the art, including the Internet. Data processing system 700 can communicate over network 730 with server system 740 (such as cloud systems as described herein), which is also not part of data processing system 700, but can be implemented, for example, as a separate data processing system 700.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 700 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

Disclosed embodiments can incorporate a number of technical features which improve the functionality of the data processing system and help produce improved manufactured products. For example, disclosed embodiments can represent patterning by using similarity transforms, such as elementary transforms. translation, rotation, uniform scaling, and combinations of transforms.

Disclosed embodiments can represent patterning using a small set of design parameters, such as a small set of ball co-ordinates and radii, one, two, or three sets of similarity transforms generating a one-, two-, or three-directional patterned lattice, respectively, or a number of pattern instances for each patterning direction.

Disclosed embodiments can use closed-form expressions for computing integral properties and employ fast algorithms for computing abstracted visualizations at adaptive levels of detail. Disclosed embodiments include intuitive tools to edit ball parameters, transformations, and number of instances.

Disclosed embodiments provide significant advantages, including the use of non-trivially patterned lattice structures, in addition to several special useful types including uniform axis-aligned, cylindrical, helical structures. Disclosed embodiments provide compact representation and provide algorithmic advantages in computing integral properties such as mass, center of mass, and moments of inertia. Disclosed embodiments enable interactive modeling and editing of lattice structures.

The following documents discuss various aspects of lattice or truss structures and related issues, and are incorporated by reference:

William Regli, Jarek Rossignac, Vadim Shapiro, and Vijay Srinivasan. *The new frontiers in computational modeling of material structures*. Computer-Aided Design, 77:73-85, 2016.

Wei Gao, Yunbo Zhang, Devarajan Ramanujan, Karthik Ra-mani, Yong Chen, Christopher B Williams, Charlie C L Wang, Yung C Shin, Song Zhang, and Pablo D Zavattieri. *The status, challenges, and future of additive manufacturing in engineering*. Computer-Aided Design, 69:65-89, 2015.

Tobias A Schaedler and William B Carter. *Architected cellular materials*. Annual Review of Materials Research, 46:187-210, 2016.

Chen Chu, Greg Graf, and David W Rosen. *Design for additive manufacturing of cellular structures*. Computer-Aided Design and Applications, 5(5):686-696, 2008.

Wenjin Tao and Ming C Leu. *Design of lattice structure for additive manufacturing*. In Flexible Automation (ISFA), International Symposium on, pages 325-332. IEEE, 2016.

Tobias A Schaedler, Alan J Jacobsen, Anna Torrents, Adam E Sorensen, Jie Lian, Julia R Greer, Lorenzo Valdevit, and Wiliam B Carter. *Ultralight metallic microlattices*. Science, 334(6058):962-965, 2011.

Alexander Pasko, Oleg Fryazinov, Turlif Vilbrandt, Pierre-Alain Fayolle, and Valery Adzhiev. *Procedural function-based modelling of volumetric microstructures*. Graphical Models, 73(5):165-181, 2011.

Jon'as Mart'mez, J'er'emie Dumas, and Sylvain Lefebvre. *Procedural voronoi foams for additive manufacturing*. ACM Transactions on Graphics (TOG), 35(4):44, 2016.

Jason Nguyen, Sang-in Park, and David Rosen. *Heuristic optimization method for cellular structure design of light weight components*. Int. J. Precis. Eng. Manuf, 14(6):1071-1078, 2013.

Erhan Batuhan Arisoy, Suraj Musuvathy, Lucia Mirabella, and Edward Slavin. *Design and topology optimization of lattice structures using deformable implicit surfaces for additive manufacturing*. In ASME 2015 International Design Engineering Technical Conferences and Computers and Information in Engineering Conference, 2015.

Jarek Rossignac and A'lvar Vinacua. *Steady affine motions and morphs*. ACM Transactions on Graphics (TOG), 30(5):116, 2011.

Stephen Daynes, Stefanie Feih, Wen Feng Lu, and Jun Wei. *Optimisation of functionally graded lattice structures using isostatic lines*. Materials & Design, 2017.

Hongqing Wang, Yong Chen, and David W Rosen. *A hybrid geometric modeling method for large scale conformal cellular structures*. In ASME Computers and Information in Engineering Conference, Long Beach, Calif., September, pages 24-28, 2005.

Gershon Elber. *Precise construction of micro-structures and porous geometry via functional composition*. In International Conference on Mathematical Methods for Curves and Surfaces, pages 108-125. Springer, 2016.

Carl S Daily, Daniel A Lees, and Dennis Donald McKitterick. *Truss structure design*, Jan. 9, 2001. U.S. Pat. No. 6,170,560.

Suraj Ravi Musuvathy. *Method for creating three-dimensional lattice structures in computer-aided design models* for *additive manufacturing*, Jan. 7, 2015. US Patent Publication 20150193559A1.

Hongqing Wang and David W Rosen. *Parametric modeling method for truss structures*. In ASME Computers and Information in Engineering Conference, 2002.

Jason Nguyen, S Park, David W Rosen, Luis Folgar, and James Williams. *Conformal lattice structure design and fabrication*. In Solid Freeform Fabrication Symposium, Austin, Tex., pages 138-161, 2012.

Yong Chen. *3D texture mapping for rapid manufacturing*. Computer-Aided Design and Applications, 4(6):761-771, 2007.

A O Aremu, J P J Brennan-Craddock, Ajit Panesar, I A Ashcroft, Richard J M Hague, Ricky D Wildman, and Christopher Tuck. *A voxel-based method of constructing and skinning conformal and functionally graded lattice structures suitable for additive manufacturing*. Additive Manufacturing, 13:1-13, 2017.

Michael F Ashby and Tianjian Lu. *Metal foams: a survey*. Science in China Series B: Chemistry, 46(6):521-532, 2003.

Xingchen Liu and Vadim Shapiro. *Sample-based synthesis of functionally graded material structures*. Journal of Computing and Information Science in Engineering, 17(3):031012, 2017.

Jon'as Mart'mez, Haichuan Song, J'er'emie Dumas, and Sylvain Lefebvre. *Orthotropic k-nearest foams for additive manufacturing*. ACM Transactions on Graphics (TOG), 36(4):121, 2017.

Stefano Gonella and Massimo Ruzzene. *Homogenization of vibrating periodic lattice structures*. Applied Mathematical Modelling, 32(4):459-482, 2008.

Ashish Gupta, George Allen, and Jarek Rossignac. *Quador: Quadric-of-revolution beams for lattices*. Computer-Aided Design, 102:160-170, 2018.

Jay Kim and Jarek Rossignac. *Screw motions for the animation and analysis of mechanical assemblies*. JSME International Journal Series C, 44(1):156-163, 2001.

Khristo N Boyadzhiev. *Spirals and conchospirals in the flight of insects*. The College Mathematics Journal, 30(1): 23, 1999.

Yong Tsui Lee and Aristides A G Requicha. *Algorithms for computing the volume and other integral properties of solids in known methods and open issues*. Communications of the ACM, 25(9):635-641, 1982.

Anthony George Maldon Michell. Lviii. *The limits of economy of material in frame-structures*. The London, Edinburgh, and Dublin Philosophical Magazine and Journal of Science, 8(47):589-597, 1904.

Matthew Thomas Wojciechowski et al. *Determining optimal geometries of plane stress truss structures using numerically mapped principal stress trajectories*. 2016.

Jonathan Hiller and Hod Lipson. *Design and analysis of digital materials for physical 3d voxel printing*. Rapid Prototyping Journal, 15(2):137-149, 2009.

Kelsey Kurzeja and Jarek Rossignac. *Rangefinder: Accelerating ball-interference queries against steady lattices*. 2018.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method, comprising:
receiving part data for a part to be manufactured;
creating a set of balls in a computer-aided design (CAD) model based on the part data, wherein the set of balls form a steady pattern structure in which each subsequent ball in the steady pattern structure is defined by applying a similarity transform that was applied to a previous ball in the steady pattern structure;
constructing a steady lattice structure in the CAD model by connecting adjacent balls in the set of balls with beams to form the steady lattice structure, and wherein:
for the balls of the steady lattice structure organized into an i×j×k array of cells with a given cell denoted as C[i, j, k]:
there exists three similarities denoted as (U, V, W) such that for all valid triplets (i, j, k) in which i∈[0, i], j∈[0, j], and k∈[0, k], C[i, j, k]=$W^k \cdot V^j \cdot U^i \cdot C_0$, wherein $C_0$, also denoted as C[0, 0, 0], is a starting ball in the set of balls; and
a given ball 'N' in cell C[i, j, k], denoted as N[i, j, k, n], is determined as $W^k \cdot V^j \cdot U^i \cdot$N[ 0,0,0, n]; and
if the steady lattice structure contains a beam B(s, e, $d_i$, $d_j$, $d_k$) that connects a ball denoted as N[i, j, k s] to a ball denoted as N[i+$d_i$, j+$d_j$, k+$d_k$, e] for a particular triplet (i, j, k), then the steady lattice structure also contains a respective beam that connects a ball denoted as N[i', j', k', s] to ball denoted as N[i'+$d_i$, j'+$d_j$, k'+$d_k$, e] for all other triplets (i', j', k') in which cells C[i', j', k'] and C[i'+$d_i$, j'+$d_j$, k'+$d_k$] exist; and
displaying the CAD model including the steady lattice structure.

2. The method of claim 1, further comprising computing integral properties of at least one of the steady lattice structure, each of a plurality of rows in the steady lattice structure, or a plurality of hubs in the steady lattice structure.

3. The method of claim 1, wherein each beam in the steady lattice structure is divided into half-beams, and the union of each ball and its connected half-beams defines a hub in the steady lattice structure.

4. The method of claim 1, wherein the steady lattice structure includes repeating patterns of hubs.

5. The method of claim 1, further comprising computing-integral properties of the steady lattice structure using closed-form expressions.

6. The method of claim 1, wherein the steady lattice structure is displayed using swirling curves.

7. The method of claim 1, further comprising manufacturing the part according to the CAD model.

8. A system comprising:
a processor; and
a non-transitory machine-readable medium comprising instructions that, when executed by the processor, cause a computing system to:
receiving part data for a part to be manufactured;
create a set of balls in a computer-aided design (CAD) model based on the part data, wherein the set of balls form a steady pattern structure in which each subsequent ball in the steady pattern structure is defined by applying a similarity transform that was applied to a previous ball in the steady pattern structure;

construct a steady lattice structure in the CAD model by connecting adjacent balls in the set of balls with beams to form the steady lattice structure, and wherein:
  for the balls of the steady lattice structure organized into an i×j×k array of cells with a given cell denoted as C[i, j, k]:
    there exists three similarities denoted as (U, V, W) such that for all valid triplets (i, j, k) in which i∈[0, i], j∈[0, j], and k∈[0, k], C[i, j, k]=$W^k \cdot V^j \cdot U^i \cdot C_0$, wherein $C_0$, also denoted as C[0, 0, 0], is a starting ball in the set of balls; and
    a given ball 'N' in cell C[i, j, k], denoted as N[i, j, k, n], is determined as $W^k \cdot V^j \cdot U^i \cdot$N[0, 0, 0, n]; and
  if the steady lattice structure contains a beam B(s, e, $d_i$, $d_j$, $d_k$) that connects a ball denoted as N[i, j, k s] to a ball denoted as N[i+$d_i$, j+$d_j$, k+$d_k$, e] for a particular triplet (i, j, k), then the steady lattice structure also contains a respective beam that connects a ball denoted as N[i', j', k', s] to ball denoted as N[i'+$d_i$, j'+$d_j$, k'+$d_k$, e] for all other triplets (i', j', k') in which cells C[i', j', k'] and C[i'+$d_i$, j'+$d_j$, k'+$d_k$] exist; and
  display the CAD model including the steady lattice structure.

9. The system of claim 8, wherein the instructions, when executed, further cause the computing system to compute integral properties of at least one of the steady lattice structure, each of a plurality of rows in the steady lattice structure, or a plurality of hubs in the steady lattice structure.

10. The system of claim 8, wherein each beam in the steady lattice structure is divided into half-beams, and the union of each ball and its connected half-beams defines a hub in the steady lattice structure.

11. The system of claim 8, wherein the steady lattice structure includes repeating patterns of hubs.

12. The system of claim 8, wherein the steady lattice structure is displayed using swirling curves.

13. A non-transitory machine-readable medium comprising instructions that, when executed by the processor, cause a computing system to:
  receive part data for a part to be manufactured;
  create a set of balls in a computer-aided design (CAD) model based on the part data, wherein the set of balls form a steady pattern structure in which each subsequent ball in the steady pattern structure is defined by applying a similarity transform that was applied to a previous ball in the steady pattern structure;
  construct a steady lattice structure in the CAD model by connecting adjacent balls in the set of balls with beams to form the steady lattice structure, and wherein:
    for the balls of the steady lattice structure organized into an i×j×k array of cells with a given cell denoted as C[i, j, k]:
      there exists three similarities denoted as (U, V, W) such that for all valid triplets (i, j, k) in which i∈[0, i], j∈[0, j], and k∈[0, k], C[i, j, k]=$W^k \cdot V^j \cdot U^i \cdot C_0$, wherein $C_0$, also denoted as C[0, 0, 0], is a starting ball in the set of balls; and
      a given ball 'N' in cell C[i, j, k], denoted as N[i, j, k, n], is determined as $W^k \cdot V^j \cdot U^i \cdot$N[0, 0, 0, n]; and
    if the steady lattice structure contains a beam B(s, e, $d_i$, $d_j$, $d_k$) that connects a ball denoted as N[i, j, k s] to a ball denoted as N[i+$d_i$, j+$d_j$, k+$d_k$, e] for a particular triplet (i, j, k), then the steady lattice structure also contains a respective beam that connects a ball denoted as N[i', j', k', s] to ball denoted as N[i'+$d_i$, j'+$d_j$, k'+$d_k$, e] for all other triplets (i', j', k') in which cells C[i', j', k'] and C[i'+$d_i$, j'+$d_j$, k'+$d_k$] exist; and
  display the CAD model including the steady lattice structure.

14. The non-transitory machine-readable medium of claim 13, wherein the instructions, when executed, further cause the computing system to compute integral properties of at least one of the steady lattice structure, each of a plurality of rows in the steady lattice structure, or a plurality of hubs in the steady lattice structure.

15. The non-transitory machine-readable medium of claim 13, wherein each beam in the steady lattice structure is divided into half-beams, and the union of each ball and its connected half-beams defines a hub in the steady lattice structure.

16. The non-transitory machine-readable medium of claim 13, wherein the steady lattice structure includes repeating patterns of hubs.

17. The non-transitory machine-readable medium of claim 13, wherein the steady lattice structure is displayed using swirling curves.

* * * * *